B. L. BOBROFF.
INDICATING DEVICE FOR VOTING MACHINES.
APPLICATION FILED JULY 23, 1917.
1,328,613.
Patented Jan. 20, 1920.
2 SHEETS—SHEET 1.
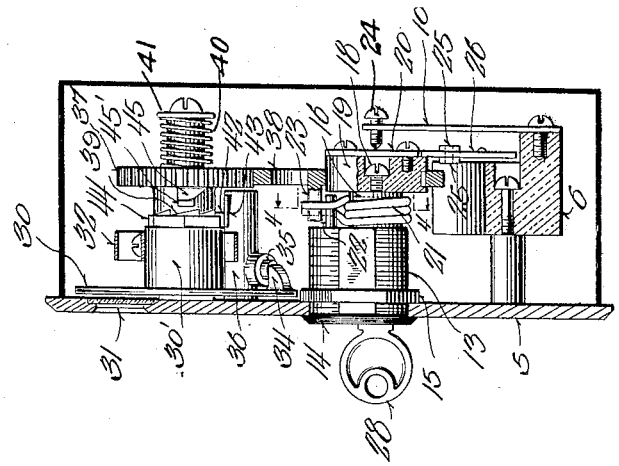
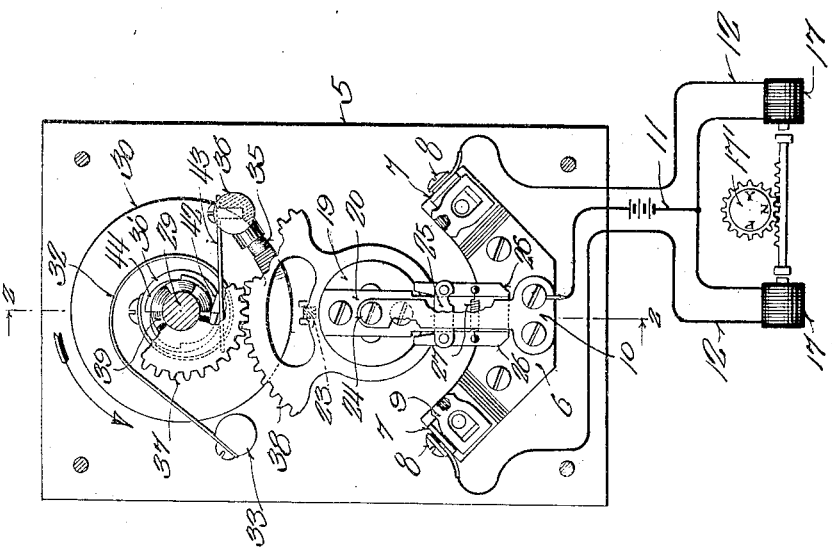

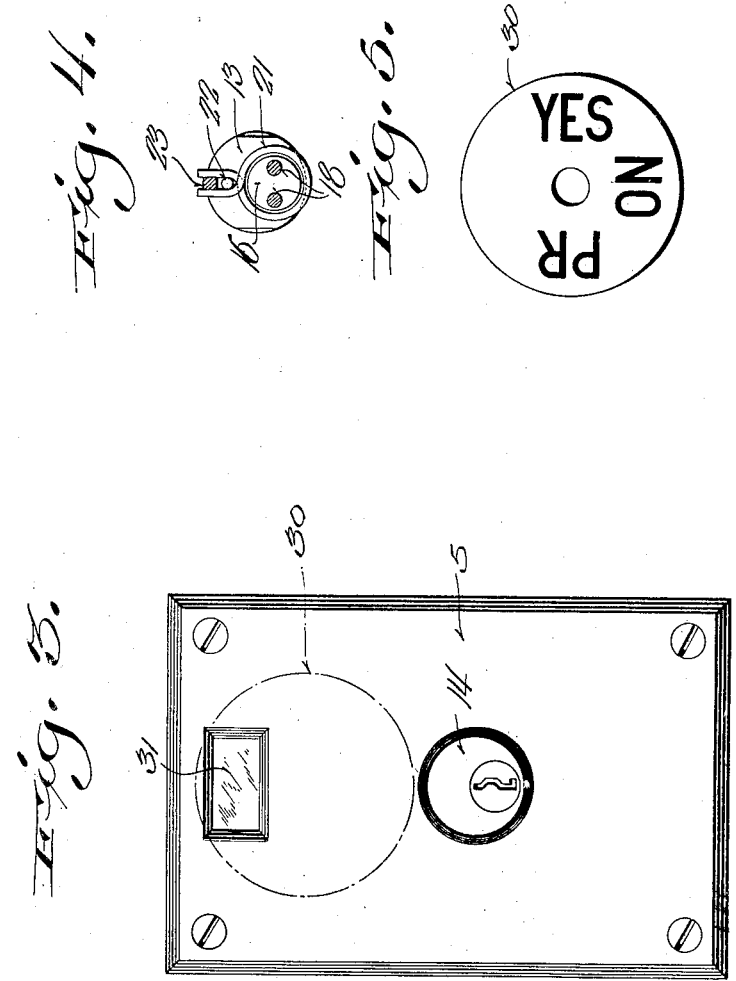

UNITED STATES PATENT OFFICE.

BORNETT L. BOBROFF, OF MILWAUKEE, WISCONSIN, ASSIGNOR, BY MESNE ASSIGNMENTS, TO EDWARD DILLMANN AND HENRY J. TURCK, TRUSTEES, OF MILWAUKEE, WISCONSIN.

INDICATING DEVICE FOR VOTING-MACHINES.

1,328,613.  Specification of Letters Patent.  Patented Jan. 20, 1920.

Application filed July 23, 1917. Serial No. 182,163.

*To all whom it may concern:*

Be it known that I, BORNETT L. BOBROFF, a citizen of the United States, and resident of Milwaukee, in the county of Milwaukee and State of Wisconsin, have invented certain new and useful Improvements in Indicating Devices for Voting-Machines; and I do hereby declare that the following is a full, clear, and exact description thereof.

This invention pertains to new and useful improvements in indicating devices particularly of that type adapted to be used with voting apparatus.

It is primarily the object of this invention to provide an indicating device in combination with a switch whereby upon operation of the latter, a symbol will be displayed which will be similar to that registrated on a voting machine, whereby the voter may ascertain whether or not his vote has been correctly recorded.

It is further an object of this invention to simplify and otherwise improve devices of this general character, the operation of which will be exceedingly positive.

With the above and other objects in view, the invention resides in the novel construction, combination and arrangement of parts substantially as hereinafter described and particularly defined in the appended claims, it being understood that such changes in the precise embodiment of the herein disclosed invention may be made as come within the scope of the claims.

In the accompanying drawings I have illustrated one complete example of the physical embodiment of my invention constructed according to the best mode I have so far devised for the practical application of the principles thereof, in which:

Figure 1 is a view in elevation with parts broken away for the purpose of illustrating structural details, said view being taken looking at the rear of the device with the casing or cover therefor removed, and a voting machine having an electrical circuit connecting the same with the switch mechanism being shown diagrammatically.

Fig. 2 is a view part in section and part in elevation, said view being taken on the plane indicated by line 2—2 of Fig. 1.

Fig. 3 is a view in elevation looking at the front of my device.

Fig. 4 is a transverse sectional view taken on the line 4—4 of Fig. 2, and

Fig. 5 is a plan view of the symbol carrying indicator employed with my switch mechanism.

Referring now more particularly to the accompanying drawings, 5 designates a front or base plate of the invention, adapted to be secured to any suitable support, and carried on this base plate is an oblong insulating block 6 which has secured to each end of its outer face a plate 7 having one side laterally turned for the reception of a binding screw 8, and having secured thereto a preferably conventional contact strip 9 U-shaped in cross section to frictionally receive a switch arm. Secured to the central portion of the block and projecting laterally therefrom in the direction of a lock member preferably of the conventional "Yale" type is a contact plate 10 and this contact plate has secured thereto a common wire 11 of a pair of circuits including wires 12 connected with the binding screws 8, the structure described thus forming the stationary contacts of a two-way switch.

The lock member comprises a barrel 13 and this barrel is passed through the front or base plate 5 and is secured thereto by a peripheral flange 14 on its outer end and by a nut 15 threaded on its body and clamping the base plate against the flange, the barrel being preferably flattened longitudinally to prevent its rotation relative to the plate. Projecting from the barrel is a spindle 16, held against relative movement longitudinally of the barrel by a plate, not shown, on the inner end of the barrel, and this spindle has secured by means of screws 18 to said projected end an insulating block 19 which carries a switch arm 20 projecting between the contact members 9. This switch arm is resiliently urged to a position intermediate of the contact members 9 by a spring wire 21 coiled about the projected end of the spindle and having its ends extended radially thereof and adapted to bear against a pin 22 projecting from the lock barrel 13 and against the laterally directed finger 23 of a segmental gear to be later described.

The contact plate 10 is resilient in nature, and has its free end disposed adjacent the axis of the lock, and passed through said free end in alinement with said lock axis is a contact screw 24 bearing against the switch arm 20 and providing for flow of current through said switch arm from the contact plate, the end of the screw being tapered to permit free rotation of the arm.

The outer side portions of the switch arm are cut away, and disposed transversely of the intermediate portion of the arm 20 are plates 25 between the outer projected ends of which are pivoted the rear ends of knife sections 26 which are normally urged in abutting relation with the sides of the arm by a coiled spring 27 secured thereto and traversing the arm. The rear inner sides of these knife sections are beveled to abut the sides of the arm and limit the outward pivotal movement of the sections.

Taking up now the operation of the invention the spindle 16 is turned in either direction by means of the usual key 28 of the lock, to engage the switch arm 20 and the adjacent side knife sections 26 thereof within either of the U-shaped contact members 9, it being noted that the laterally turned sides of the plates 7 form stops limiting movement of the switch arm 20, and that the contact members 9 are of sufficient width to procure contact engagement thereof with both the switch arm 20 and the adjacent knife section 26. Upon releasing the key, the switch arm will immediately move back to intermediate position under action of the spring 21. The resilient strength of the U-shaped contact members 9, is however, greater than the resilient strength of the spring 27, and thus in moving from contacting relation with one of the contact members 9, the adjacent knife section 26 would be retained therein and would move pivotally with respect to the switch arm, and upon the knife section reaching its limit of pivotal movement, it would be released from the contact member 9, and the spring 27 being then under tension would procure a snapping movement. The two independent circuits formed by these parts and the wires 11 and 12 each are connected to the solenoids 17 which operate an indicating disk 17', but any other suitable indicating device could be equally as well used.

The structure just defined constitutes no important feature of this invention except in its combination with the indicating means which I employ and which is operable upon the movement of the switch arm carrying block 19.

Mounted upon the front or base plate 5 and disposed above the spindle 16, is a shaft 29 on which is loosely journaled an indicator disk 30 having thereon suitable symbols, as in this instance, PR, NO, and YES adapted to register with a sight opening 31 in the front plate 5. This disk 30 is normally urged to non-indicating position by means of a coil spring 32 having its end secured to the shank 30' of the disk 30 and its outer end secured to a post 33 mounted upon the plate 5. In order to provide for the limiting of the return movement of the disk by means of spring 32, a stop 34 in form of a lug is provided on the rear face of disk 30 and is adapted to abut a cushioned stop 35 carried by a post 36 projecting rearwardly from the base plate 5, said post 36 being approximately on the same horizontal plane as post 33 and disposed on the side of disk 30 opposite said post 33.

Also loosely journaled on shaft 29, outward of disk 30, is a tooth gear wheel 37 in mesh with a segmental gear 38 carried by the block 19. A clutch connection 39 is formed between the shank 30' of the indicator disk and the shank of gear 37 and said clutch 39 is normally urged to operative engagement by means of a spring 40 coiled about the outer end of shaft 29 and bearing against the outer face of gear 37 and the inner face of a washer 41 carried by said outer end of shaft 29.

As will be readily understood when the switch arm 20 is moved to the right, see Fig. 1, to engagement with contact 9 the indicator 17' of the voting machine will be advanced to the first symbol YES and is then returned to normal position, and if the arm 20 is again moved to the right to contact with member 9, the second symbol NO will appear, and so on, and when it is desired to return the indicator 17' to normal position or non-registering position the blade 20 is moved to engage with contact member 9 to the left of Fig. 1.

As will be understood when the arm 20 is moved to the right, the mechanism being viewed as in Fig. 1, it advances the indicator disk 30 to the first symbol thereon. "YES", corresponding with the first symbol of the voting machine and when arm 20 returns to neutral position the disk 30 will remain at indicative position, the dog or pawl 42 carried by spring arm member 43 having one end secured to post 36 engaging one of the four ratchet teeth 44 formed on the shank 30' outward of clutch member 39.

If the arm 20 is again moved to the right, the mechanism being viewed as in Fig. 1, the disk 30 is advanced to the second symbol "NO," and at the same time the corresponding symbol on the disk 17' of the voting machine is displayed, the dog 42 again preventing the return of the disk by means of spring 32 to non-registering position.

As will be readily seen when the arm 20 is returned to normal position by means of its spring 21, the segmental gear 38 is returned to its normal position, the clutch member 39 slipping to permit this, as will be obvious.

To provide for the return of disk 30 to non-registering position, a lug 45 is provided on the under face of gear 37 and this lug is shouldered as at 45' for engagement with the end of spring member 43 outward of lug 42, as later described. Upon the movement of arm 20 to the left, the mechanism being viewed as in Fig. 1, the disk 17' of the voting machine is returned to non-registering position as hereinbefore described, and at the same time gear 37 is revolved, the clutch member 39 slipping, until the cam face of lug 45 engages the outer end of spring member 43 and rides thereon until its shoulder portion 45 engages the same and disengages lug 42 from teeth 44, and at the same time breaks clutch 39 permitting the spring 32 to return the disk to non-registering position. When the arm 20 is returned to normal position by means of its spring 21, the gear wheel 37 will be rotated disengaging lug 45 from spring member 43 permitting the parts to again resume their normal position, ready to be again operated.

From the foregoing description taken in connection with the accompanying drawings it will be readily seen that I have devised a practical and efficient means for simultaneously registering at the operating switch the vote registered at the voting machine.

I claim:

1. An indicating device including a shaft, an indicating disk rotatable on the shaft and having symbols thereon adapted to successively move to indicating position upon rotation of the disk, an operating member revoluble on the shaft, a releasable connection between said member and the disk, means for rotating the member in one direction to revolve the disk in one direction whereby to successively bring the symbols on the latter into indicating position, means connected with said disk to hold the same in one of its indicating positions, said operating member being movable in a reverse direction without actuating said disk, and means carried by the operating member for releasing the last mentioned means when said member is rotated in a reverse direction.

2. An indicating device including a shaft, an indicating disk rotatable on the shaft and having symbols thereon adapted to successively move to indicating position, means for normally urging the disk to non-indicating position, a gear wheel slidable and rotatable on the shaft, co-acting clutch teeth on the adjacent faces of the wheel and disk, a stop on the end of the shaft, an expansible spring on said shaft between said stop and gear wheel to normally urge the latter toward the disk, means for rotating the gear wheel in either direction, it being adapted to revolve the disk when moved in one direction, and means for holding said disk in the positions in which it is moved by the gear wheel.

3. An indicating device including a shaft, an indicating disk on the shaft having symbols thereon adapted to successively move to indicating position upon rotation of the disk, an actuating collar on the shaft, a clutch connection between the collar and the disk, means for rotating the collar to procure rotation of the disk, ratchet teeth carried by the disk, a pawl engageable with the ratchet teeth to prevent rotation thereof in one direction, means urging said disk to rotation in said direction, and an abutment carried by the actuating collar and engageable with said pawl to retract the same.

4. In a device of the class described, a carrying plate having a sight opening therein, a shaft supported by the plate, an indicating disk rotatable on the shaft and having symbols thereon adapted to register with the sight opening, an operating member revoluble on the shaft, a releasable connection between the member and the disk, means for rotating the member in one direction to revolve the disk in one direction whereby to successively bring the symbols on the latter into registration with the sight opening, means connected with said disk to hold the same in one of its indicating positions, said operating member being movable in a reverse direction without actuating said disk, and means carried by the operating member for releasing the last mentioned means when said member is rotated in a reverse direction.

In testimony that I claim the foregoing I have hereunto set my hand at Milwaukee, in the county of Milwaukee and State of Wisconsin.

BORNETT L. BOBROFF.